Sept. 9, 1969  R. H. BISBING  3,466,076
DRAW PULL CATCH
Filed Sept. 15, 1967  2 Sheets-Sheet 1

INVENTOR.
Robert H. Bisbing
BY
Paul & Paul
ATTORNEYS.

Sept. 9, 1969   R. H. BISBING   3,466,076
DRAW PULL CATCH
Filed Sept. 15, 1967   2 Sheets-Sheet 2
Fig. 7
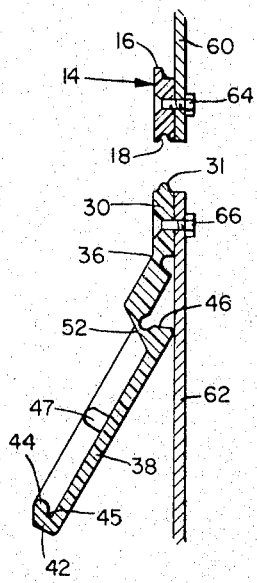
Fig. 8
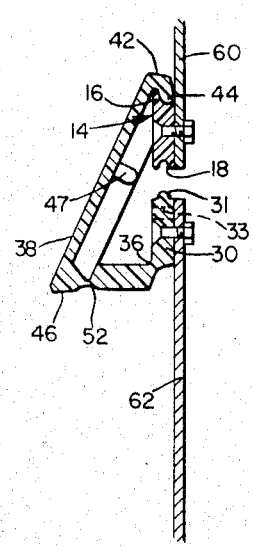
Fig. 9
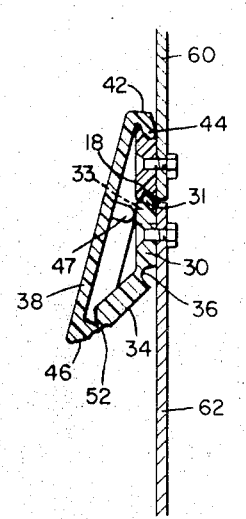
Fig. 10
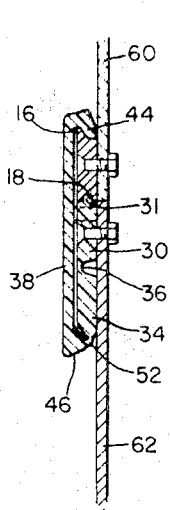
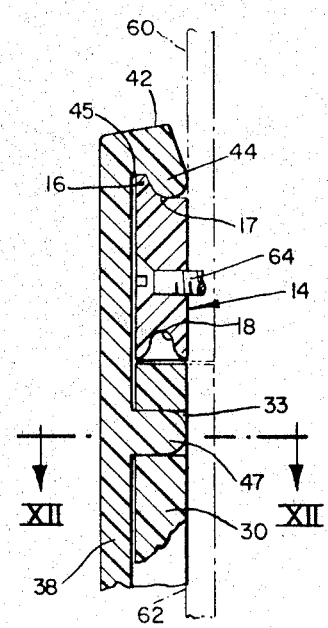
Fig. 11
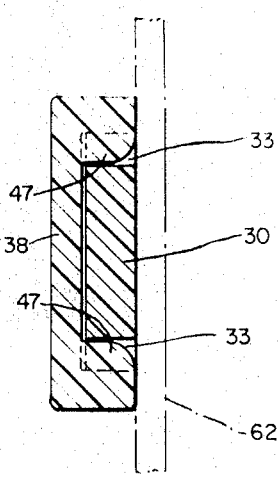
Fig. 12
INVENTOR.
Robert H. Bisbing
BY
Paul + Paul
ATTORNEYS.

United States Patent Office 3,466,076
Patented Sept. 9, 1969

3,466,076
DRAW PULL CATCH
Robert H. Bisbing, Springfield, Pa., assignor to Southco, Inc., Lester, Pa., a corporation of Delaware
Filed Sept. 15, 1967, Ser. No. 667,906
Int. Cl. E05c *19/14;* B65d *45/32*
U.S. Cl. 292—109                                             2 Claims

ABSTRACT OF THE DISCLOSURE

A catch for securing two members together, has a part which is affixed to one of said members and a second one-piece part which is composed of three segments, i.e. a base segment, a locking segment, and an intermediate segment. The base segment is adapted for being affixed to the second one of the members and the intermediate segment is flexibly connected to the base segment and the locking segment for pivotal movement of the segments about transverse axes. When in the locked condition the intermediate segment is disposed substantially in coplanar relation to the base segment, and the locking segment is disposed in overlying relation to the base segment and the intermediate segment and to the first mentioned part. The locking segment is detachably connected to the first mentioned part, and the flexible connection between the intermediate and the locking segment is closer to the second member than the flexible connection between the intermediate and the base segment. The base segment has recesses in the longitudinal sides thereof which mate with detents in the cavity of the locking segment.

BACKGROUND OF THE INVENTION

This invention relates to a catch for locking two members or panels together. More specifically, this invention relates to a catch having but two components, one component formed with flexible segments so that upon proper engagement of the components and manual application of pressure, the catch draws together and locks the two panels.

In my U.S. Patent No. 3,181,905, issued May 4, 1965, I have disclosed variations of such a catch in detail. Therein the catch is composed of two members, one of which has three segments flexibly connected to one another, this portion being constructed of a flexible material so that the catch is inexpensive to manufacture and yet effective to draw together and lock two panels or the like. The materials involved normally does not weaken after repeated flexures. However, due to the excessive forces which may be encountered in various applications of my device, the flexible portion of the member may become stretched and eventually break or cause the fastener to pop open.

SUMMARY OF THE INVENTION

This invention covers a load relieving means for use with a catch of the type described which is formed integrally with the component formed of the flexible segments and which comprises mating detent-recess portions which coact on closing of the catch to absorb the longitudinal load on the catch.

Accordingly, an object of this invention is to provide in a catch having only two parts which is constructed of a flexible material so that the catch is inexpensive to manufacture and yet effective to draw together and lock the two panels, an improvement which provides superior life and creep characteristics and superior holding power.

BRIEF DESCRIPTION OF THE DRAWINGS

FIG. 7 is a sectional view of the catch taken along the lines and arrows VII—VII as shown in FIG. 4;

FIG. 8 is a sectional view of the catch taken along the lines and arrows VIII—VIII as shown in FIG. 5;

FIG. 9 is a sectional view of the mounted catch wherein the closing is more complete than in FIG. 8;

FIG. 10 is a sectional view taken along the lines and arrows X—X of FIG. 6 showing the catch in the fully closed position;

FIG. 11 is a partial sectional view taken as indicated by the lines and arrows XI—XI of FIG. 6, enlarged to show other parts of the catch in the fully closed position; and FIG. 12 is a sectional view taken as indicated by the lines and arrows XII—XII in FIGS. 6 and 11.

DESCRIPTION OF THE PREFERRED EMBODIMENTS

Figures 1, 2, 3:
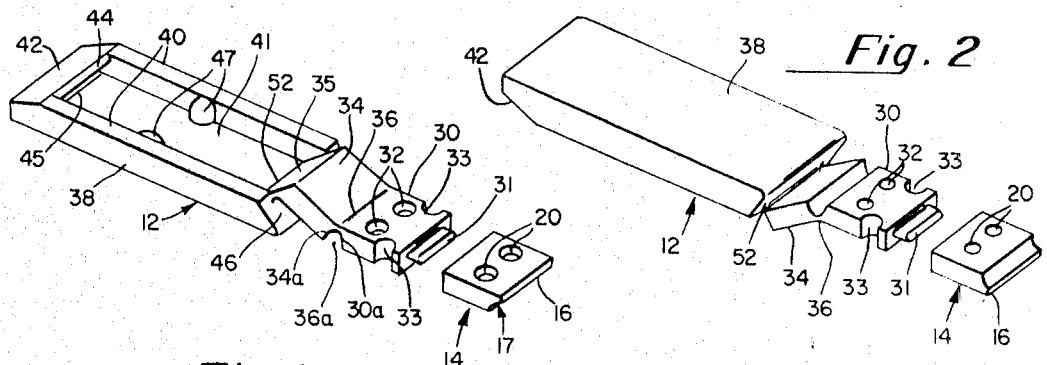
FIG. 1 is a perspective view of one form of the catch of this invention consisting of two parts.
FIG. 2 is a perspective view of the catch shown in FIG. 1 as seen from the reverse side.
FIG. 3 is a perspective view from the reverse side of one part of the catch shown in FIGS. 1 and 2.

Although specific forms of the invention have been selected for illustration in the drawings, and the following description is drawn in specific terms for the purpose of describing these forms of the invention, this description is not intended to limit the scope of the invention which is defined in the appended claims.

Referring first to FIG. 1 of the drawings, one form of the draw pull catch according to the teaching of this invention is shown. The catch comprises a latch or segmented part 12 and a separate stud or projecting part 14.

The stud part 14, although shown having a flattened cubical shape in the drawings, can be formed in other suitable shapes and can be formed integral with one panel to be joined. The stud is equipped with an extending flange 16 at one end. Flange 16 extends completely across the width of the stud part 14 adjacent the top surface with a curved recessed area 17 below. Countersunk holes 20 are provided in stud 14 so that the element can be securely bolted, screwed or nailed to one of the locked panels or members.

The latch part 12 of the catch is basically a one-piece, segmented part consisting of a base or stationary segment 30 joined by a thin, flexible connection 36 to an intermediate or connecting segment 34 which in turn is joined by another flexible connection 52 to a locking segment 38. The base segment 30 is provided with two countersunk holes 32 which are designed to receive a pair of bolts, etc., so that the segment 30 and the entire segmented part 12 can be securely fastened to the second panel or member which is to be locked to the first panel. A centrally located plug 31 is provided on the open end of segment 30. Referring to FIG. 3, the stud part 14 has a centrally located deep groove 18 in the end opposite the extending flange 16; the groove 18 being of such dimension to accept and tightly hold therein plug 31 of the base 30. Provision of plug 31 and groove 18 as described above allows the stud 14 and the latch parts to be correctly aligned thus preventing undesired side movement when the two parts are engaged. Holes 20 and 32 are countersunk so that screws or the like will fit flush with the top surfaces of the stud 14 and segment 30.

Spaced along the sides of the base 30 are two substantially semicylindrical recesses 33, one on each side of the base 30. These recesses are formed perpendicular to the face of the base. The function of these recesses will be more fully described below in connection with the locking action.

The intermediate segment 34 of the latch part is roughly cubical in shape and has a flat beveled edge 35 at the end opposite to the flexible connection 36. The adjacent end walls 30a and 34a of the base 30 and the intermediate segment 34 respectively which are approximate to the connection 36, are curved at their juncture, so that the connection 36 and the space 36a located therebeneath provides for easy flexing of the two segments 30 and 34.

Locking segment 38 has roughly a box shape with two parallel side walls 40 and an end wall 42. The center area 41 is as wide as segments 34 and 30, and stud 14. End wall 42 is constructed so as to have overhanging edge 44 located toward the top, as shown in FIG. 1, and a slightly recessed area 45 therebeneath. At the opposite end of locking segment 38, end wall 46 is beveled on the outside and on the inside so as to have a triangular shape in sectional view. (See FIG. 7.) Flexible connection 52 joins the segments 34 and 38 allowing free movement at this point. The end wall 46 and the adjacent end of the intermediate segment 34 which are approximate to the flexible connection 52, are curved at their juncture to provide the easy flexing of the two segments 34 and 38. Two lugs or detents 47 are molded into the cavity of the locking segment 38, one on each of the parallel side walls 40. The lugs 47 are substantially semicylindrical and disposed perpendicular to the face of the segment 38. The outer ends of the lugs are semispherical in shape. The lugs are disposed to mate with the recesses 33 in the base 30, as will be more fully described below. The lugs are accurately positioned along the side walls 40, as will be more fully described below in connection with the locking action. The function of these beveled surfaces and shapes is described below.

Figures 4, 5:
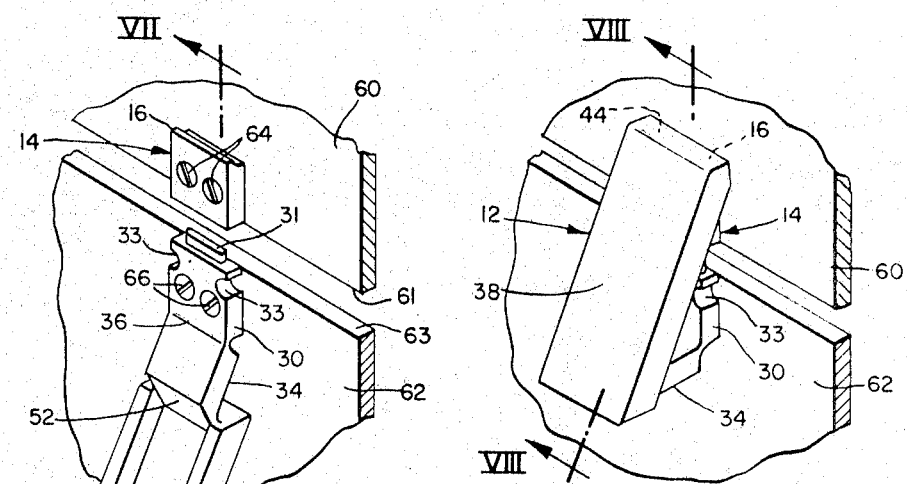
FIG. 4 is a perspective view of the catch of FIG. 1, showing one method of mounting the catch on two panels.
FIG. 5 is a perspective view of the mounted catch in the partially closed position.

In FIG. 2, the draw pull catch illustrated in FIG. 1 is shown inverted. It is apparent from the figure that the stud flange 16 is located adjacent the upper surface of the stud when the stud is mounted, as shown in FIG. 4. Base segment 30 and intermediate segment 34 of the segmented latch part 12 are flat and smooth on the bottom surfaces which fit against the surface of the members to be locked. It should be understood as clearly illustrated in FIGS. 1 and 2, that the segments 30, 34 and 38 are strongly joined and flexibly connected at connections 36 and 52 so that these portions are free to flex in relation to one another, as described below. The substantially semicircular curves at the connections 36 and 52 serve to relieve the stresses in the flexing area and provide greater strength through the connections.

Figure 6:
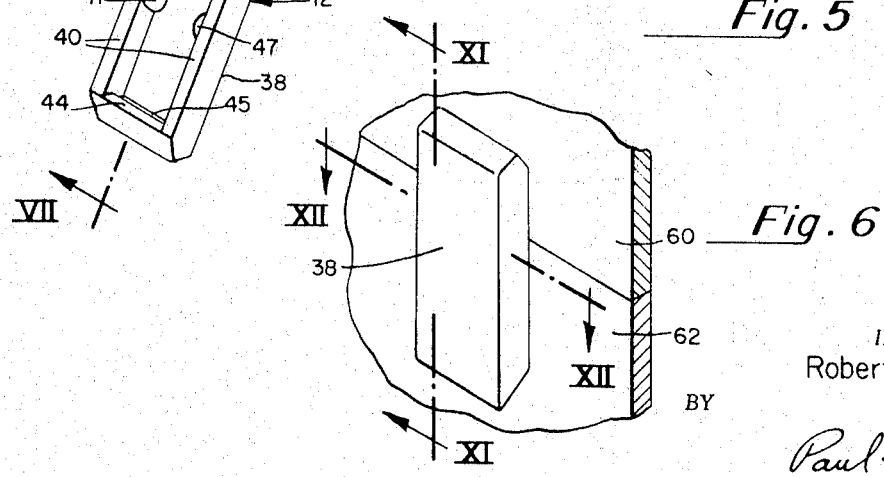
FIG. 6 is a perspective view of the mounted catch in the fully closed position.

Referring now to FIGS. 4–6, installation and operation of the preferred form of the draw pull catch shown in FIGS. 1 and 2 are illustrated. In FIG. 4, the stud 14 is mounted on one panel or member 60 which is to be locked to and against a second panel 62. It should be understood that the catch of this invention can effectively be used in various structural arrangements so as to lock large boxes, panels, or the like together. Two bolts 64 pass through the stud and panel and hold stud 14 securely against the face of panel 60 and adjacent the lower edge 61. It should be observed that the plug 31 of the base 30 (which is likewise mounted adjacent the upper edge 63 of panel 62) extends slightly beyond the upper edge 63 of panel 62 and as such is in position to fit within groove 18 (concealed) of stud 14. The intermediate segment 34 is shown partially flexed at connection 36 and supporting the locking segment 38 hanging therebeneath. It should be recognized that the parts 12 and 14 can be arranged in the reverse position or in any other position so long as they are opposing and attached to the panels which are to be locked together.

In comparing FIG. 5 with FIG. 4, note that in FIG. 5 the locking segment 38 has been rotated around flexible connection 52 so that the extending edge 44 is positioned over flange 16 of the stud 14. (See FIG. 8.) When so positioned, flange 16 fits within indentation 45 so that the locking segment 38 is securely held by the stud. It is apparent that the width of stud 14 must be slightly less than or just equal to the distance between the two side walls 40 of the locking segment 38.

In comparing FIG. 6 with FIGS. 4 and 5, note that in FIG. 6 locking segment 38 has been manually pressed downward at its lower end by the operator so that intermediate segment 34 is flat against the surface of panel 62 and in alignment with segment 38. As further disclosed in FIGS. 9 and 10, intermediate segment 34 and the end wall 46 of portion 38 are so shaped that when locking segment 38 is pressed into locking position, as shown in FIG. 6 it becomes locked in that position and unable to spring outwardly. The locking occurs because the segments form a toggle catch in which flexible connection 52, when locked, is closer to panel 62 than flexible connection 36. As the upward moment of force on locking segment 38 is concentrated at connection 52 adjacent panel 62, segment 34 is pressed upward against fixedly mounted base segment 30 and the flexible connection 36 is held closed. When locking segment 38 and, in particular connection 52, is pulled away from panel 62, the moment of force on connection 52 is positioned further away from the panel than connection 36 and the catch swings open. It should be recognized that segment 38 completely covers the other segments and stud 14 of the catch, so that the outward appearance is solely that of a smooth, substantially flat cubical latch.

A typical use for this catch is in securing the front panels of a box having a lid with a handle for carrying the box, and a base or container portion hinged to the lid. It will be apparent that the force distributed through the catch as a result of carrying the box by the handle will be greater than the force normally required merely to overcome the toggle action of the catch in closing it. With repeated application of this external force, the flexible connections 36 and 52 will tend to stretch under the load and eventually break or cause the fastener to pop open. In order to relieve the stress on these connections, I have provided the lugs 47 and mating recesses 33 in the latch part 12.

Referring now to FIGS. 7–10, the draw pull catch as shown in perspective view in FIG. 1 is illustrated in these figures in sectional view.

FIG. 7 depicts the catch in the same position as shown in FIG. 4 wherein stud 14 and base segment 30 are held by a plurality of bolts 64 and 66 to panels 60 and 62.

In FIG. 8, locking segment 38, and particularly protruding edge 44, is locked around stud flange 16 thereby securing the top of the locking segment 38 to the stud 14. As locking segment 38 is pressed downwardly, the top panel 60 moves into contact against the bottom panel 62 as shown in FIG. 9. At this point, base plug 31 becomes firmly centered within groove 18 of stud 14 thereby positioning and aligning the two catch parts and the two panels.

In FIG. 10, locking segment 38 is in the fully closed position whereby all three segments or portions 30, 34 and 38 extend parallel to the panels.

It will be observed that in FIGS. 5 and 8 there is no particular stress on the flexible connections. It is only when the catch is pressed downwardly as in FIGS. 9 and 10 to the closing position, that real stress is generated in the catch. In the position shown in FIG. 9, the base 30 is already partially within the cavity of the locking segment 38. As the locking segment 38 is depressed to lock the catch, the lugs 47 engage the recesses 33. Initially, the rounded terminal surface of the lugs 47 contact the outer edge of the respective recesses 33. As additional force is applied to the locking segment 38 to overcome the longitudinal resistance to full closure of the panel members 60 and 62, the lug is cammed into the recess. The longitudinal load is taken by the lugs 47, the end wall 42 and the portion of the locking segment 38 defined therebetween. (See FIG. 11.) Little or no load pases through the flexible connections 36 and 52.

Thus, all external loads applied to the catch are carried by the stud part 14, the base 30 between the recesses 33 and the end 31 thereof, and the end roll 42 and the lugs 47 in the locking segment 38. No external loading is carried through the flexible connections once the catch is closed into the fully closed position shown in FIG. 11.

The catch of this invention can be formed or manufactured from a number of materials which are sufficiently flexible and strong. A preferred material for the catch and, in particular, the segmented flexible element is polypropylene, but other species in the group of thermoplastics having similar characteristics also can be used. Polypropylene is an extremely suitable material because it is capable of practically an unlimited number of flexings without weakening or failure of the material.

It will be understood that various changes in the details, materials and arrangement of parts which have been herein described and illustrated in order to explain the nature of this invention, may be made by those skilled in the art within the principle and scope of the invention.

What is claimed is:

1. In a catch for securing two members together, the combination comprising:
   (a) a part adapted for being affixed to one of said members;
   (b) a one-piece part including a base, locking and intermediate segments, said base segment being adapted for being affixed to the second one of said members, said intermediate segment being flexibly connected to said base and locking segments for pivotal movement of said segments about transverse axes, and when in the locked condition said intermediate segment being disposed substantially in coplanar relation to said base segment and said locking segment being disposed in overlying relation to said base and intermediate segments and to said first mentioned part, said locking segment being detachably connected to the first mentioned part, and the flexible connection between said intermediate and locking segments being closer to said second member than the flexible connection between said intermediate and base segments; and
   (c) stress relieving means disposed on said base segment and said locking segment for relieving the stress on said flexible connections, comprising a pair of substantially semicylindrical lugs oppositely disposed with respect to one another within said locking segment and a pair of substantially semicylindrical recesses oppositey disposed with respect to one another in said base segment so as to engage said lugs upon closing of said catch.

2. The catch as defined in claim 1 wherein the outer terminal surface of each lug is substantially semispherical.

References Cited
UNITED STATES PATENTS

| | | | |
|---|---|---|---|
| 2,643,150 | 6/1953 | Giles | 292—256.69 |
| 3,181,905 | 5/1965 | Bisbing | 292—109 |

MARVIN A. CHAMPION, Primary Examiner
ROBERT L. WOLFE, Assistant Examiner

U.S. Cl. X.R.
292—256.69